F. P. TOWNSEND.
MOTOR CONTROLLER.
APPLICATION FILED OCT. 15, 1910.
1,140,545.
Patented May 25, 1915.
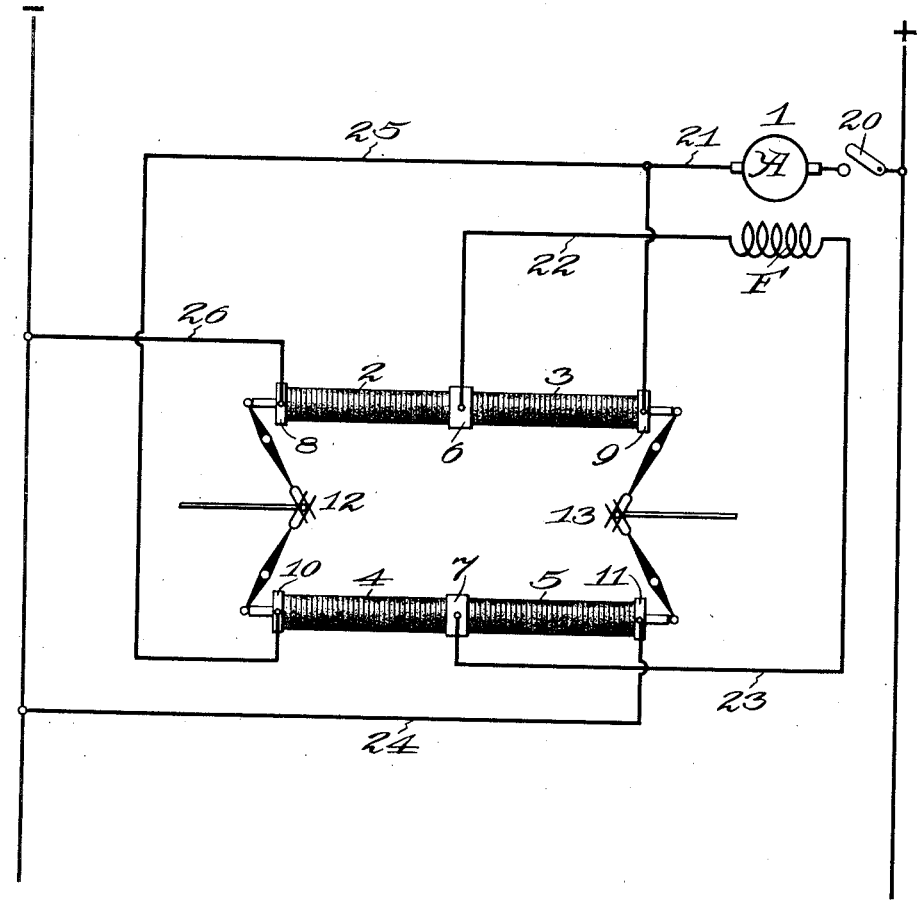
Witnesses:
George Haynes
M. S. Peterson
Inventor:
Frank P. Townsend.
By Edwin B. H. Tower, Jr.
atty.

UNITED STATES PATENT OFFICE.

FRANK P. TOWNSEND, OF ELYRIA, OHIO, ASSIGNOR TO THE CUTLER-HAMMER MFG. CO., OF MILWAUKEE, WISCONSIN, A CORPORATION OF WISCONSIN.

MOTOR-CONTROLLER.

1,140,545.         Specification of Letters Patent.     Patented May 25, 1915.

Application filed October 15, 1910. Serial No. 587,178.

*To all whom it may concern:*

Be it known that I, FRANK P. TOWNSEND, a citizen of the United States, residing at Elyria, in the county of Lorain and State of Ohio, have invented new and useful Improvements in Motor-Controllers, of which the following is a full, clear, concise, and exact description, reference being had to the accompanying drawing, forming a part of this specification.

My invention relates to improvements in the method of reversing electric motors and means for accomplishing the same.

It is the principal object of my invention to accomplish the reversal of an electric motor without requiring reversing switches and to provide a simple and efficient device for such purposes.

Various other objects and advantages of my invention will be hereinafter clearly and fully set forth.

For the purpose of more fully disclosing the nature and characteristic features of my invention, I shall describe the controller diagrammatically illustrated in the accompanying drawing, which embodies my invention in one form. It should be understood, however, that the controller illustrated is susceptible of various modifications within the scope of my invention and that my method of control might be accomplished by other instrumentalities than those illustrated.

Referring now to the drawing, I have shown therein a motor 1, having an armature A and a series field winding F. The controller for the motor comprises four resistances, 2, 3, 4 and 5. Each of the resistances comprises a pile of carbon disks adapted to be compressed to vary the ohmic value thereof. While I have illustrated carbon disks, it should be understood that any other compressible resistance bodies or materials might be used. The number of piles of carbon disks and the arrangement thereof may be varied as desired. As illustrated, the carbon disk piles 2 and 3 are in alinement while the piles 4 and 5 are in alinement. The piles 2 and 3 are separated by and adapted to be compressed against a conducting block 6, while a conducting block 7, similar to the block 6, is interposed between the piles 4 and 5. The several piles of carbon disks may be compressed separately or in groups as desired. As illustrated, the same are adapted to be compressed in groups.

At the ends of the carbon disk piles, 2, 3, 4 and 5 are provided movable conducting and compressing blocks 8, 9, 10 and 11, respectively. The blocks 8 and 10 are arranged to be moved in unison to compress the piles 2 and 4 by suitable lever connections 12, while the blocks 9 and 11 are adapted to be moved in unison to compress the piles 3 and 5 by similar lever connections 13. Of course, in practice, any suitable means might be provided for compressing the carbon disk piles, either automatically or manually and interlocks might be provided between the operating means to insure proper manipulation thereof. The terminals of the field winding of the motor are connected directly to the conducting blocks 6 and 7. One terminal of the motor is connected through a suitable switch 20 to one of the supply lines, while the other terminal of the motor is connected to the conducting blocks 9 and 10 of the resistances 3 and 4 respectively. The conducting blocks 8 and 11 of the resistances 2 and 5 are connected to the other supply line.

I shall now describe the operation and functions of the controller, at the same time clearly setting forth the circuit connections: Assuming the switch 20 to be closed and the carbon disk piles 3 and 5 to be compressed, current will flow from the positive side of the supply circuit through switch 20 and the motor armature by conductor 21 through the carbon disk pile 3 by conductor 22 through the series field winding F by conductor 23 through the carbon disk pile 5 by conductor 24 to the negative side of the supply circuit. The motor will thus be started, and upon further compression of the carbon disk piles 3 and 5 will be gradually brought up to normal speed. The reason that the current takes this path, under the conditions set forth, is obvious for said path is of less resistance than the path through the carbon disk piles 2 and 4, which have not been compressed. Assuming now that piles 2 and 4 are compressed instead of the piles 3 and 5, then current will flow through the motor armature as already described by conductors 21 and 25 through the carbon disk pile 4 by conductor 23 through the series field winding by conductor 22 through the carbon disk pile 2 by conductor 26 to the negative side of the supply circuit. Under these conditions, it will be seen that the flow of current through the series field winding is in an opposite direction from that previously described, while the direction of the flow of current through the motor armature remains the same. Accordingly, under the conditions just set forth the motor will operate in a reverse direction and upon continued compression of the carbon disk piles 2 and 4, the motor will be gradually brought up to normal speed. It will thus be seen that the direction of operation of the motor is controlled entirely by rheostatic means, no reversing switches being required. It will further be understood that the same results might be obtained by the use of various kinds of rheostatic devices.

Having thus described my invention what I claim as new and desire to secure by Letters Patent is:

1. The combination with a motor having a series field winding, of a plurality of compressible resistances connected to the armature and series field winding of said motor and means to compress said resistances to vary the potential impressed on said motor and to vary the direction of flow of current through one of the elements thereof.

2. The combination with a motor having a series field winding, of a plurality of compressible resistances connected in circuit with said motor, and means for independently compressing said resistances in sets to vary the potential impressed upon the armature and series field winding of said motor and to reverse the flow of current through one of the same.

3. In combination, a series motor, two compressible resistance devices connected in series with the motor armature and having the motor field interposed between the same, two other compressible resistance devices each connected in parallel to one of said first mentioned devices, but arranged to have current flow therethrough in a reverse direction, said first mentioned devices when compressed increasing the potential impressed upon the motor armature to cause the motor to operate in one direction and said second mentioned devices when compressed increasing the potential impressed upon the motor armature and reversing the polarity of the field of the motor to reverse the direction of operation of the motor armature.

4. In combination, a series motor, two compressible resistance devices connected in series with the motor armature and having the motor field interposed between the same, two other compressible resistance devices each connected in parallel to one of said first-mentioned devices but arranged to have current flow through in a reverse direction, said first-mentioned devices when compressed increasing the potential impressed upon said motor to cause the same to operate in one direction and said second mentioned devices when compressed increasing the potential impressed on said motor and reversing the polarity of the motor field to cause said motor to operate in an opposite direction, and means for controlling said devices.

In witness whereof, I have hereunto subscribed my name in the presence of two witnesses.

FRANK P. TOWNSEND.

Witnesses:
J. LEE WILLIAMS,
W. H. HOTTSLEM.